US007512745B2

(12) United States Patent
Gschwind et al.

(10) Patent No.: US 7,512,745 B2
(45) Date of Patent: Mar. 31, 2009

(54) METHOD FOR GARBAGE COLLECTION IN HETEROGENEOUS MULTIPROCESSOR SYSTEMS

(75) Inventors: Michael K. Gschwind, Chappaqua, NY (US); John Kevin Patrick O'Brien, South Salem, NY (US); Kathryn M. O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/380,683

(22) Filed: Apr. 28, 2006

(65) Prior Publication Data

US 2007/0255909 A1    Nov. 1, 2007

(51) Int. Cl.
 *G06F 12/00* (2006.01)
(52) U.S. Cl. ............... 711/147; 711/153; 711/173; 711/E12.011; 707/206
(58) Field of Classification Search ............ 711/147, 711/153, 170–173, E12.011; 707/206
See application file for complete search history.

(56) References Cited

U.S. PATENT DOCUMENTS 6,865,585 B1 * 3/2005 Dussud ................ 707/206

OTHER PUBLICATIONS

T. Endo, K. Taura, and A. Yonezawa, "A Scalable Mark-Sweep Garbage Collector on Large-Scale Shared-Memory Machines", ACM/IEEE SuperComputing Conf., Nov. 1997.*
J. Kahle, M. Day, H. Hofstee, C. Johns, T. Maeurer, and D. Shippy, "Introduction to the Cell Multiprocessor", IBM J. Res. & Dev., Jul./Sep. 2005 pp. 589-604.*
Boehm, Hans-J., "Fast Multiprocessor Memory Allocation and Garbage Collection", HP Labs Technical Report 2000-165, Hewlett-Packard Company, 2000, 10 pages.

* cited by examiner

*Primary Examiner*—Matt Kim
*Assistant Examiner*—John P Fishburn
(74) *Attorney, Agent, or Firm*—Francis Lammes; Stephen J. Walder, Jr.; Matthew B. Talpis

(57) ABSTRACT

Garbage collection in heterogeneous multiprocessor systems is provided. In some illustrative embodiments, garbage collection operations are distributed across a plurality of the processors in the heterogeneous multiprocessor system. Portions of a global mark queue are assigned to processors of the heterogeneous multiprocessor system along with corresponding chunks of a shared memory. The processors perform garbage collection on their assigned portions of the global mark queue and corresponding chunk of shared memory marking memory object references as reachable or adding memory object references to a non-local mark stack. The marked memory objects are merged with a global mark stack and memory object references in the non-local mark stack are merged with a "to be traced" portion of the global mark queue for re-checking using a garbage collection operation.

5 Claims, 6 Drawing Sheets

METHOD FOR GARBAGE COLLECTION IN HETEROGENEOUS MULTIPROCESSOR SYSTEMS

BACKGROUND

1. Technical Field

The present application relates generally to an improved data processing system and method. More specifically, the present application is directed to a system and method for garbage collection in heterogeneous multiprocessor systems.

2. Description of Related Art

When computer programs execute, they allocate memory for data buffers. When the computer program continues to allocate such memory, it may eventually exceed the physical memory capacity. In such a situation, the operating system must place portions of the program in virtual memory, i.e. on disk, in order to continue executing, which slows down execution of the computer program. Manually deallocating memory after a routine no longer needs that portion of memory is a tedious task which programmers often forget to do, or do not do properly.

As an alternative to manual deallocation of memory, garbage collection was developed. Garbage collection is the use of a software routine that searches memory for areas of inactive data and instructions in order to reclaim that space for the general memory pool, i.e. the heap. A garbage collector basically works by determining what data objects in a program will not be accessed in the future execution of the program, and reclaiming storage used by those objects.

Garbage collection automates the freeing up of memory so that the programmer no longer has to worry about releasing objects that are no longer needed. As a result, this source of considerable program design effort may be avoided. Moreover, garbage collection aids in making programming languages safer due to the reduction in several classes of runtime errors, e.g., dangling pointer errors where a reference to a deallocated object is used.

Many computer programming languages, referred to as garbage-collected languages, now require garbage collection either as part of the language specification (e.g., Java, C#, and most scripting languages) or effectively for practical implementation (e.g., formal languages like lambda calculus). Other computer programming languages are designed for use with manual memory management, but have garbage collected implementations (e.g., C, C++). Other computer programming languages, such as Modula-3, allow both garbage collection and manual memory management to co-exist in the same application by using separate heaps for collected and manually managed objects.

Tracing garbage collectors are the most common type of garbage collector. Tracing garbage collectors focus on determining which objects are reachable, or potentially reachable, and then discarding all remaining objects. A reachable object may be defined as an object for which there exists some name in the program environment that leads to it, either directly or through references from other reachable objects. More precisely, objects can be reachable in only two ways. First, a distinguished set of objects are assumed to be reachable, these are known as the roots. Typically, these include all the objects referenced from anywhere in the call stack, i.e. all local variables and parameters in the functions currently being invoked, and any global variables. Second, anything referenced from a reachable object is itself reachable. This is referred to as transitivity.

Tracing garbage collectors use an algorithm in which they perform garbage collection cycles. A cycle is started when the collector decides, or is notified, that it needs to reclaim storage, which in particular happens when the system is low on memory. All tracing garbage collectors implement some variant of the tri-color marking abstraction, but simple collectors, such as the mark-and-sweep collector, often do not make this abstraction explicit. Tri-color marking works as follows.

First, initial white, grey and black sets are created that will be used to maintain progress during the cycle. Initially, the white set, or condemned set, is the set of objects that are candidates for having their memory recycled. The black set is the set of objects that can be easily proven to have no references to objects in the white set. In many implementations the black set starts off empty. The grey set is all the remaining objects that may or may not have references to objects in the white set. These sets partition memory such that every object in the system, including the root set, is in precisely one set.

Thereafter, an object in the grey set is selected. This object is blackened, i.e. moved to the black set, by "greying" all the white objects it references directly, i.e. blackening all the white objects that the object references and objects that they reference. This step is repeated until the grey set is empty. When there are no more objects in the grey set, then all the objects remaining in the white set are provably not reachable and the storage occupied by them can be reclaimed.

With the tri-color marking algorithm, no black object points directly to a white object. This ensures that the white objects can be safely destroyed once the grey set is empty.

Once the unreachable set, i.e. the resulting white set when the grey set is empty, has been determined, the garbage collector may simply release the unreachable objects and leave everything else as it is. Alternatively, the garbage collector may copy some or all of the reachable objects into a new area of memory, updating all references to those objects as needed. These are called "non-moving" and "moving" garbage collectors, respectively.

Tracing collectors may also be categorized by considering how the three sets of objects (white, grey, and black) are maintained during a collection cycle. The most straightforward approach is the semi-space collector, which is a moving garbage collection scheme in which memory is partitioned into a "from space" and "to space". Initially, objects are allocated into "to space", until it becomes full and a garbage collection cycle is triggered. At the start of the garbage collection, the "to space" becomes the "from space", and vice versa. The objects reachable from the root set are copied from the "from space" to the "to space". These objects are scanned in turn, and all objects that they point to are copied to "to space" until all reachable objects have been copied to "to space". Once the program continues execution, new objects are once again allocated from the "to space" until it is once again full and the process is repeated. This approach has the advantage of conceptual simplicity, since the three object color sets are implicitly constructed during the copying process, but the disadvantage that a very large contiguous region of free memory may possibly be needed on every collection cycle.

In general, a "mark and sweep" garbage collector maintains one or two bits with each object to record whether it is white or black. The grey set is either maintained as a separate list or is identified using another bit. As the reference tree is traversed during a collection cycle, these bits are manipulated by the collector to reflect the current state, i.e. white, black, or grey. The mark and sweep strategy has the advantage that, once the unreachable set is determined, i.e., the resulting white set after the grey set is empty, either a moving or non-moving collection strategy can be pursued. This choice of strategy can even be made at runtime, as available memory permits.

In some implementations of garbage collectors, the mark and sweep garbage collector uses an explicit stack to store objects which are known to be reachable, but whose contents have not yet been examined (i.e. the "grey" objects). Each entry in the stack contains a base address and a mark descriptor, indicating the location of possible pointers relative to that starting address. Mark descriptors typically take the form of either a simple length specification, or a bit vector describing pointer locations.

In addition to the above, garbage collectors may also be of various types with regard to how they interrupt other operations of the system in which they operate. For example, "stop-the-world" garbage collectors completely halt execution of the program to run a collection cycle, thus guaranteeing that new objects are not allocated and objects do not suddenly become unreachable while the collector is running. This has the obvious disadvantage that the program can perform no useful work while a collection cycle is running.

"Incremental" garbage collectors are designed to reduce this disruption by interleaving their work with activity from the main program. Careful design is necessary to ensure that the main program does not interfere with the garbage collector and vice versa. For example, when the program needs to allocate a new object, the runtime system may either need to suspend it until the collection cycle is complete or somehow notify the garbage collector that there exists a new, reachable object.

Finally, a concurrent garbage collector can run concurrently in real time with the main program on a symmetric multiprocessing machine. Complex locking regimes may be necessary in order to guarantee correctness. Moreover, cache issues also make this less helpful than one might imagine. Nonetheless, concurrent GC may be desirable for SMP applications with high performance requirements.

The garbage collection mechanisms described above have been developed for data processing environments in which there is a uniformity of the processors, e.g., single processor or symmetric multiprocessing (SMP) systems. A number of issues may arise when attempting to apply such garbage collection mechanisms to non-uniform data processing systems, i.e. heterogeneous systems such as non-SMP co-processor systems, software managed memory systems, Non-Uniform Memory Access (NUMA) systems, and the like. Address format issues, address translation issues, when garbage collection may be performed so as to ensure that pointers to memory locations do not change, non-uniform memory latency, and the like, are but a few of the problems introduced by heterogeneous systems.

SUMMARY OF THE INVENTION

In one illustrative embodiment, a method, in a data processing system, is provided for performing a garbage collection operation on a shared memory. The illustrative embodiment loads, in a processor of the multiprocessor data processing system, a portion of a global mark queue corresponding to a portion of the shared memory. In the illustrative embodiment the portion of the global mark queue corresponding to the portion of the shared memory is loaded by initially populating a local mark stack based on references to memory objects in the portion of the global mark queue, and loading, in a local store of the processor, the portion of the shared memory corresponding to the portion of the global mark queue. In the illustrative embodiment, each processor in the plurality of processors of the multi-processor data processing system loads different portions of the global mark queue and corresponding different portions of the shared memory and performs a marking operation on the different portions of the shared memory based on memory object references in the different portions of the global mark queue. The illustrative embodiment performs a marking operation on the portion of the shared memory based on references to memory objects in the portion of the global mark queue assigned to the processor, to thereby identify reachable memory objects whose associated memory cannot be reclaimed as part of the garbage collection operation. The illustrative embodiment identifies, during the marking operation, references to memory objects that are not in the portion of the shared memory assigned to the processor, for further processing as part of the garbage collection operation. In the illustrative embodiment, the marking operation is performed on the portion of the shared memory based on references to memory objects by tracing memory object references in the portion of the global mark queue and references to dependent memory objects until a reference to a memory object that is not within the portion of the shared memory is identified, references to memory objects that are within the portion of the shared memory are stored in the local mark stack, references to memory objects that are not within the portion of the shared memory are stored in a non-local mark stack, a local mark descriptor data structure associated with the local mark stack is merged with a global mark descriptor data structure, and the non-local mark stack is merged with a "to be traced" portion of the global mark queue. In the illustrative embodiment, the "to be traced" portion of the global mark queue contains memory object references that are to be processed by performing the marking operation. In the illustrative embodiment, the local mark descriptor data structure contains reachability information for memory objects whose references are in the local mark stack. In the illustrative embodiment, the global mark descriptor data structure comprises all references to memory objects that were identified as being within the portion of the shared memory, in local mark stacks of processors of the multiprocessor data processing system.

These and other features and advantages of the present invention will be described in, or will become apparent to those of ordinary skill in the art in view of, the following detailed description of the example embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments provide a system and method for performing garbage collection in a heterogeneous system. The mechanisms of the illustrative embodiments may be implemented in any heterogeneous multiprocessor system in which garbage collection needs to be performed. Examples of such heterogeneous multiprocessor systems include NUMA systems, non-SMP multiprocessor systems, and the like. One such heterogeneous multiprocessor system in which exemplary aspects of the illustrative embodiments may be implemented is the Cell Broadband Engine (CBE) available from International Business Machines, Inc. of Armonk, N.Y. While the illustrative embodiments will be described in terms of the mechanisms being implemented in the CBE architecture, it should be appreciated that this is only exemplary and the mechanisms of the illustrative embodiments may also be implemented in other heterogeneous multiprocessor systems without departing from the spirit and scope of the present invention.

Figure 1:
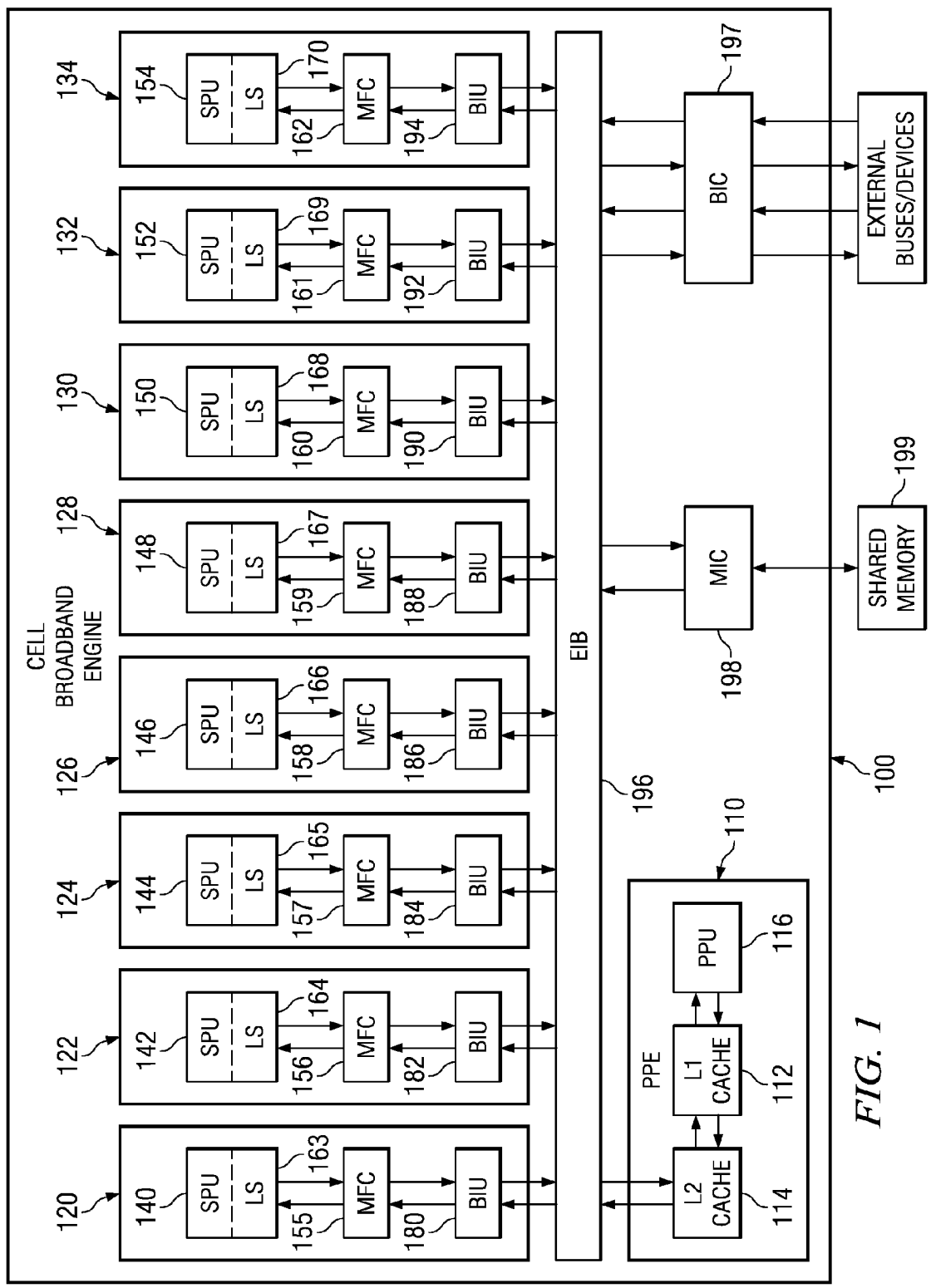
FIG. 1 is an exemplary block diagram of a heterogeneous multiprocessor system in which exemplary aspects of the illustrative embodiments may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a Power processor element (PPE) 110 having a processor (PPU) 116 and its L1 and L2 caches 112 and 114, and multiple synergistic processor elements (SPEs) that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes SIMD vector instructions.

The SPEs are coupled to each other and to the L2 cache 114 via the EIB 196. In addition, the SPEs are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs makes the CBE 100 capable of handling 10 simultaneous threads and over 128 outstanding memory requests. The PPE 110 acts as a controller for the other eight SPEs which handle most of the computational workload. The PPE 110 may be used to run conventional operating systems while the SPEs perform vectorized floating point code execution, for example.

The SPEs comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2:
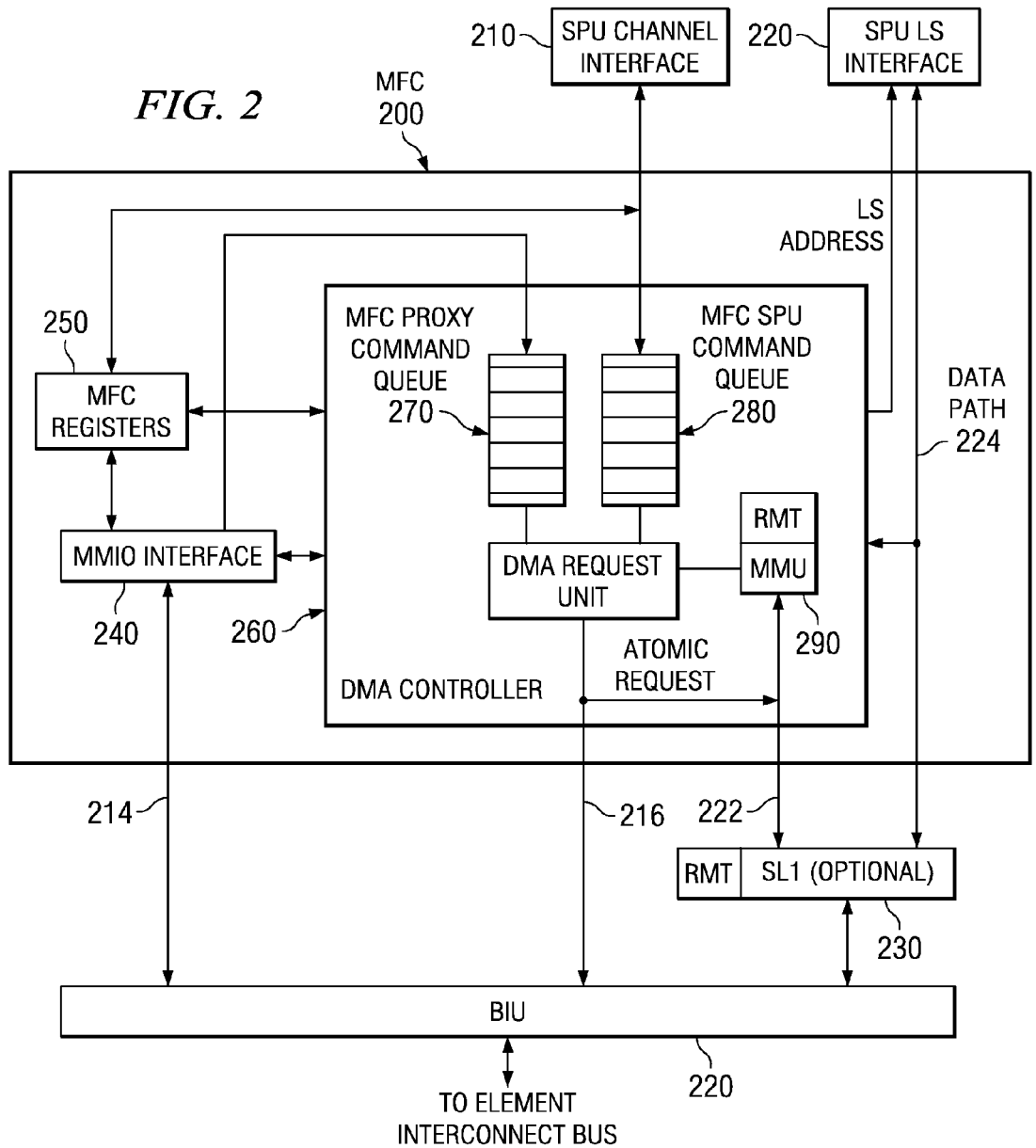
FIG. 2 is an exemplary diagram illustrating a memory flow controller in which exemplary aspects of the illustrate embodiments may be implemented.

FIG. 2 is an exemplary block diagram of a typical memory flow control (MFC) unit 200 in accordance with an exemplary embodiment of the present invention. In this exemplary embodiment, the MFC 200 has two interfaces 210 and 212 to the SPU, two interfaces 214 and 216 to the Bus Interface Unit (BIU) 220, and two interfaces 222 and 224 to an optional SL1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local storage in the SPU. One interface 216 to the BIU 220 allows Memory Mapped I/O (MMIO) access to the MFC facilities. This interface 216 also allows other processors to issue MFC commands. Commands issued using MMIO are referred to as MFC proxy commands.

The interfaces 222 and 224 to the SL1 cache are mainly for data transfers. One interface 222 is used by the MFC 200 for access to the address translation tables in main storage and the other 224 is used for the transfer of data between main storage and local storage.

As shown in FIG. 2, the main units in a typical MFC include a memory mapped input/output (MMIO) interface 240, MFC registers 250, and DMA controller 260. The MMIO interface 230 maps the MFC facilities of the SPU into the real address space of the system. This allows access to the MFC facilities from any processor, or any device in the system. In addition, the MMIO interface 240 may be configured to map the local storage of the SPU into the real address space. This allows direct access to the local storage from any processor or any device in the system, enabling local-store-tolocal-store transfers and the ability for I/O devices to directly access the local storage domain of an SPU.

The MFC registers unit 250 contains most of the MFC facilities. Of particular importance to the present invention, the MFC registers unit 250 includes an SPU local storage limit register facility. With this facility, privileged software may set a limit on the size of the local storage of the SPE, as will be described in greater detail hereafter.

The synchronization and the transfer of data is generally the responsibility of the DMAC 260 within the MFC 200. The DMAC 260 can move data between the local storage of an SPU and the main storage area. Optionally, the data can be cached in the SL1 cache.

The SPE and PPE instruct the MFC 200 to perform these DMA operations by queuing DMA command requests to the MFC through one of the command queues 270 and 280. Commands issued by an SPE are queued to the MFC SPU command queue 270. Commands issued by a PPE are queued to the MFC proxy command queue 280. The MFC uses a memory mapping unit (MMU) 290 to perform all MFC address translations and MFC access protection checks required for the DMA transfers.

MFC commands provide the main method that enables code executing in a SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

In general, commands can be queued using MMIO registers of the MFC registers unit 250, or through channel instructions executed by the associated SPU. The MMIO method is intended for use by the PPE to control the transfer of data between main storage and the associated local storage on behalf of the SPE. MFC commands that transfer data are referred to as MFC DMA commands. The data transfer direction for MFC DMA commands is always referenced from the perspective of an SPE. Therefore, commands that transfer data into an SPE (from main storage to local storage) are considered get commands, while commands that transfer data out of an SPE (from local storage to main storage) are considered put commands.

Commands that transfer data are referred to as MFC DMA commands. These commands are converted into DMA transfers between the local storage domain and main storage domain. Each MFC can typically support multiple DMA transfers at the same time and can maintain and process multiple MFC commands. Each MFC DMA data transfer command request involves both a local storage address (LSA) and an effective address (EA). The local storage address can directly address only the local storage area of its associated SPU. The effective address has a more general application in that it can reference main storage, including all the SPU local storage areas, if they are aliased into the real address space.

The illustrative embodiments provide mechanisms for performing garbage collection operations in a heterogeneous multiprocessor system, such as the Cell Broadband Engine (CBE) described above. Taking the CBE as exemplary of other heterogeneous multiprocessor systems in which the mechanisms of the illustrative embodiments may be utilized, garbage collection mechanisms may be provided in each of the SPEs to perform the garbage collection operations of the illustrative embodiments as described hereafter. For example, the garbage collection mechanisms may comprise hardware and/or software elements that are integrated with the memory flow controllers (MFCs) of the SPEs. In addition, the PPE 110 may be provided with similar mechanisms to perform garbage collection.

In some illustrative embodiments, garbage collection operations are distributed across a plurality of the processors, e.g., SPEs 120-134 and PPE 110, in the heterogeneous multiprocessor system, e.g., CBE 100. In other illustrative embodiments, the garbage collection operations may be performed by a single processor, e.g., SPE 134, in the heterogeneous multiprocessor system. With this single garbage collection processor embodiment, the garbage collection processor, e.g., SPE 134, may be dedicated to performing only garbage collection or may perform garbage collection in addition to other service tasks.

It should be noted that in the following description of the illustrate embodiments, reference will be made to "system memory" and "shared memory" which are used interchangeably. Such references are intended to refer to the portion of the system memory or shared memory that serves as a heap for a particular program in question. Thus, there may be many different programs running within the heterogeneous multiprocessor system that make use of the shared or system memory and which each have their own heap for dynamic allocation of memory. Thus, the garbage collection described herein is performed with respect to the system memory or shared memory that is allocated to a particular program of interest.

Taking an illustrative embodiment in which the garbage collection is distributed across a plurality of the SPEs 120-134, in one illustrative embodiment, the PPE 110 may instruct the SPEs to perform garbage collection so as to reclaim portions of the shared memory 199 that are allocated to memory objects (hereafter referred to as "system memory objects") that are no longer referenced by a program running in the heterogeneous processor system. In an alternative illustrative embodiment, the SPEs 120-134 may independently determine that garbage collection is required based on a predetermined criteria, e.g., an amount of free space in the shared memory 199 being below a threshold, and may initiate garbage collection operations themselves. In such an alternative embodiment, the SPE 120-134 detecting the need for garbage collection may communicate this need to the other SPEs 120-134 and the PPE 110.

In response to the instruction from the PPE 110, or alternatively, an SPE 120-134, the SPEs 120-134 spawn collection threads that are used to perform the garbage collection operations described hereafter. The SPEs 120-134, and possibly the PPE 110, stop their execution of other threads, such as in a "stop-the-world" type garbage collection, and execute the spawned collection threads so as to perform the garbage collection.

As part of the garbage collection, the PPE 110 generates a global mark queue that contains references to memory objects in the shared memory 199 for the running program. The generation of such global mark queues is generally known in the art and details are not provided herein. For example, generation of a global mark queue and use of a global mark queue with parallel garbage collection is generally described in Boehm, "Fast Multiprocessor Memory Allocation and Garbage Collection", HP Labs Technical Report 2000-165, Hewlett-Packard Company, 2000, which is hereby incorporated by reference.

The global mark queue may be organized, for example, by memory pages such that references to system memory objects stored on the same memory page are represented in the global mark queue as adjacent entries. In this way, portions of the global mark queue may be easily associated with portions of the shared memory 199.

The collection threads of each of the SPEs 120-134 obtain a chunk of the shared memory 199 and a corresponding portion of a global mark queue and store them in local stores 163-170 associated with the SPEs 120-134. Thus, each SPE 120-134 will have a copy of a different portion of the global mark queue and a copy of a corresponding different chunk of the shared memory 199 on which it operates. In the context of this description, a "chunk" of memory is an area of memory being worked on. In a preferred embodiment, this area is adjacent and co-located, but in other embodiments, a "chunk" of memory may consist of multiple logically or otherwise related portions of data in the system or shared memory 199.

The collection threads running on each SPE 120-134 perform a "mark and sweep" operation on each of their respective chunks of shared memory 199 based on the system memory objects referenced in the corresponding portion of the global mark queue. The portion of the global mark queue that is retrieved by the SPE 120-134 has references, i.e. pointers, from the program, to system memory objects that are to be checked by the "mark and sweep" operation. It is these references, and their references to dependent memory objects, that are traced during the "mark and sweep" operation to thereby identify which memory objects are reachable and not reachable by the program of interest.

The references, or pointers, utilize the shared memory address space and thus, need to be translated into the local store address space for the SPE 120-134 since the chunk of shared memory 199 that is being checked now resides within the local store 163-170 associated with the SPE 120-134. Such address translation may involve, for example, taking the shared memory 199 address, subtracting the base address of the chunk that is transferred to the local store, and adding a local store offset. This address translation gives the local store address of the same system memory object referenced by the global address space pointer in the portion of the global mark queue. Those of ordinary skill in the art will recognize that other means of translating between address spaces may be used with the illustrative embodiments without departing from the spirit and scope of the present invention.

During the "mark and sweep" operation performed by the collection threads, the initial memory objects referenced by the portion of the global mark queue will be present in the chunk of shared memory 199 that is loaded into the corresponding local store 163-170. However, the chunk of shared memory 199 may contain other memory objects that are not referenced by pointers in the portion of the global mark queue and thus, may be "unreachable" if not referenced by memory objects whose pointers are in other portions of the global mark queue or are not referenced by other memory objects whose pointers are in other portions of the global mark queue.

Moreover, during the "mark and sweep" operation, references to other objects may be encountered that are not present within the chunk of shared memory 199 loaded into the local store 163-170 of the particular SPE. These references to memory objects in other chunks of the shared memory 199 must be tracked along with the tracking of reachable and non-reachable memory objects in the chunk of shared memory 199 loaded into the local store 163-170.

In order to track the various types of memory objects, the local "mark and sweep" operation performed by the collection threads of the illustrative embodiments makes use of two mark stacks per SPE 120-134. The first mark stack, i.e. the local mark stack, stores pointers, or references, to memory objects that are reachable by the software program in the chunk of shared memory 199 loaded into the local store 163-170 of the SPE 120-134. The local mark stack is populated by the portion of the global mark queue that is loaded into the SPE along with its corresponding chunk of shared memory 199. It is this local mark stack that is traversed during the mark and sweep operation with each memory object referenced in the local mark stack being traced in accordance with a marking operation to thereby mark all reachable memory objects from the memory object referenced in the local mark stack.

The second mark stack, i.e. the non-local mark stack, stores pointers to memory objects that are referenced by the software program but are not in the current chunk of shared memory 199 loaded in the local store 163-170. Pointers or addresses to memory objects are added to the non-local mark stack during the tracing of a memory object referenced in the local mark stack. That is, during the tracing of memory objects that are reachable by the memory object referenced in the local mark stack, a reference or pointer to another memory object that is not within the chunk of shared memory 199 stored in the local store may be encountered. In response to such an occurrence, the reference or pointer to this "non-local" memory object is added to the non-local mark stack.

The placement of pointers to memory objects into the various stacks may be performed, for example, by using an explicit stack to store objects which are known to be reachable, but whose contents have not yet been examined (i.e. the "grey" objects). Each entry in the stack contains a base address and an offset indicating the location of possible pointers relative to that starting address. Offsets typically take the form of either a simple length specification, a bit vector, or the like, for describing pointer locations.

Each of the memory objects may have an associated mark descriptor that identifies the memory object as being reachable or not reachable. The mark descriptors for each memory object may be part of a general mark descriptor for the chunk of shared memory 199, pages of the shared memory 199, or the like. Memory objects that are part of the portion of the global mark queue copied into the local store 163-170 of the SPE 120-134 and which have not been traced may have their mark descriptor initially set as "0" or "00", for example, to indicate that these objects are not reachable. Thereafter, these mark descriptor values may be set to "1" or "01", for example, as determinations are made, during a marking phase of the "mark and sweep" operation, that the memory objects are reachable.

Thus, initially, all of the memory objects in the heap for the program in question may be set to a "not reachable" state at initialization of a garbage collection operation on the SPEs 120-134. When a portion of the global mark queue is retrieved by an SPE and its corresponding chunk of shared memory 199 is loaded into the local store, the address and offset for the memory objects in the portion of the global mark queue are added to the local mark stack. In addition, the mark descriptor for the memory object may be added to a general mark descriptor data structure for the chunk of shared memory 199. Although, for purpose of clarity, the mark descriptor will be shown in the figures and referred to in the description hereafter as a separate data structure from the local mark stack, it should be appreciated that the mark descriptors may be associated with, and even part of, the entries in the local mark stack for the various memory object references added to the local mark stack.

After having initially populated the local mark stack, the next memory object in the local mark stack is identified and traced using a marking operation of a "mark and sweep"

garbage collection operation. That is, the next memory object in the local mark stack is marked as reachable and becomes a "current" memory object. The memory objects that are referenced by the "current" memory object are identified from the chunk of shared memory 199 loaded in the local store. A determination is made as to whether the memory objects that are referenced by the "current" memory object are within the chunk of shared memory 199 in the local store. If so, the mark descriptors for these memory objects are then set to a "reachable" state.

If a reference or pointer to a memory object is encountered during this marking operation that points to a memory object in a different chunk of the shared memory 199 than the one that is loaded in the local store, the reference to that memory object is added to the non-local mark stack. Thus, through the marking operation, references to memory objects in the local mark stack are marked, in their associated mark descriptors, as being reachable in the chunk of shared memory 199 in the local store. Other memory objects referenced by the memory objects in the local mark stack may or may not be reachable in the chunk of shared memory 199 that is presently in the local store. Thus, these memory objects may have their mark descriptors updated to show that they are reachable within the chunk of shared memory 199, or their references may be added to a non-local mark stack if they are not in fact reachable in the chunk of shared memory 199 in the local store.

When all of the system memory objects in the portion of the global mark queue have been checked by the SPE 120-134, through a "mark and sweep" operation as discussed above, the system memory objects which remain unreached, e.g., whose mark descriptors are "0" or "00", for that chunk of shared memory 199 are candidates for having their portion of memory reclaimed. However, this system memory cannot be reclaimed at this time since there may be other references to these memory objects from system memory objects in other portions of the global mark queue, which may or may not be processed by other SPEs 120-134 in the CBE 100, depending upon the particular embodiment.

The collection threads, after having marked the system memory objects as either being reachable in the chunk of shared memory 199 (i.e., reached during the processing of the local mark stack), not in the chunk of shared memory 199 (i.e., in the non-local mark stack), or not reachable in the chunk of shared memory 199 (i.e., having possible references remaining in the portion of the global mark queue, or having already been previously reached), performs a merge operation for merging the references to memory objects in the non-local mark stack with the portion of the global mark queue that still needs to be traced, to thereby generate an updated "to be traced" portion of the global mark queue. As a result, the references to memory objects that are not in the local store copy of the chunk of shared memory 199 may be re-checked, by the same or a different SPE 120-134, with other chunks of the shared memory 199. This process may be repeated until the updated "to be traced" portion of the global mark queue contains no references to system memory objects.

In addition, the collection threads merge reachability information, e.g., mark descriptors, about memory objects obtained from processing the local mark stack with reachability information obtained by processing of other local mark stacks of other SPEs 120-134 to generate global reachability information captured in a global mark descriptor. The global mark descriptor represents those system memory objects that are reachable by the software program and thus, cannot have their system memory reclaimed. System memory objects that do not have references present in the global mark descriptor are candidates for memory reclamation.

Merging a local mark descriptor indicating reachable memory objects with the global descriptor can be achieved by performing a set of OR operations. However, atomicity must be guaranteed, as described by Boehm, op cit. The merge operation therefore, merges mark descriptors for memory objects such that there is a single entry for each merged memory object indicating that the memory object is reachable by the software program in question. That is, the merge operation eliminates any duplicate entries for a same memory object. Thus, with the illustrative embodiments, unlike prior art garbage collectors which update a common mark descriptor, each mark thread contains a local chunk-specific mark descriptor that is merged into a global mark descriptor for the heap associated with the program in question.

Merging can be performed with an adapted memory flow controller (MFC) having support for performing atomic read-modify-write cycles to perform the logical OR of a local mark descriptor into the global mark descriptor, an MFC having been optimized to include specific descriptor merge capabilities, or by using software locks on descriptor maps. Such software locks are ideally obtained only during the short period of the merge process. To optimize merging and reduce contention for merge locks, multiple merge locks corresponding to regions of the mark descriptor can be maintained.

In an optimized embodiment, the mark descriptor for a chunk of memory being processed may be obtained by copying the global mark descriptor. This optimization advantageously reduces the number of trace steps that must be performed by reducing the number of duplicate tracing. This optimization may also be used to prevent livelocks in an illustrative embodiment.

In yet another optimization, no lock is obtained for performing a copy operation to obtain an initialized version of the local descriptor. This optimization eliminates lock synchronization overhead at the cost of missing at least a portion of possibly concurrent updates to traced and marked reachable locations.

A similar merge operation may be performed for merging the non-local mark stacks with the global mark queue to generate an updated "to be traced" portion of the global mark queue. The merge operations to merge non-local stacks into the global mark queue essentially generate a data structure containing pointers to system memory objects wherein each system memory object only has one entry in the data structure. That is, the merge operation eliminates duplicate entries such that each system memory object appears in the resulting data structure only once. The result is a listing of system memory objects that still need to be traced by a "mark and sweep" operation.

The above process may be repeated by each SPE 120-134 each time the SPE 120-134 completes its "mark and sweep" operation with regard to the portion of the global mark queue and chunk of system memory copied into the local store of that SPE 120-134. It should be appreciated that, since some references to system memory objects are merged back into the "to be traced" portion of the global mark queue, the same references to system memory objects may be checked multiple times. While this may introduce some inefficiencies, the more efficient parallel "mark and sweep" operations provide a greater relative performance benefit than the slight inefficiency experienced with redundant checks of system memory objects.

When there are no more references to system memory objects in the updated "to be traced" portion of the global mark queue, each reference to system memory objects in the heap for the software program in question, present in the shared memory 199, will either be marked as being reachable in the global mark descriptor or will be unreachable by the software program in question. Those references to system memory objects not having been reached by the mark process are objects whose corresponding portion of shared memory 199 may be reclaimed. Portions of the shared memory 199 associated with all other system memory objects in the global marked stack are reachable by the software program and thus, are not reclaimed.

A reclamation process may then be performed to reclaim the system memory associated with the system memory objects that are not marked in the global mark descriptor as reachable. Such reclamation processes are generally known in the art and thus, a detailed explanation of such reclamation processes is not provided herein.

Figure 3:
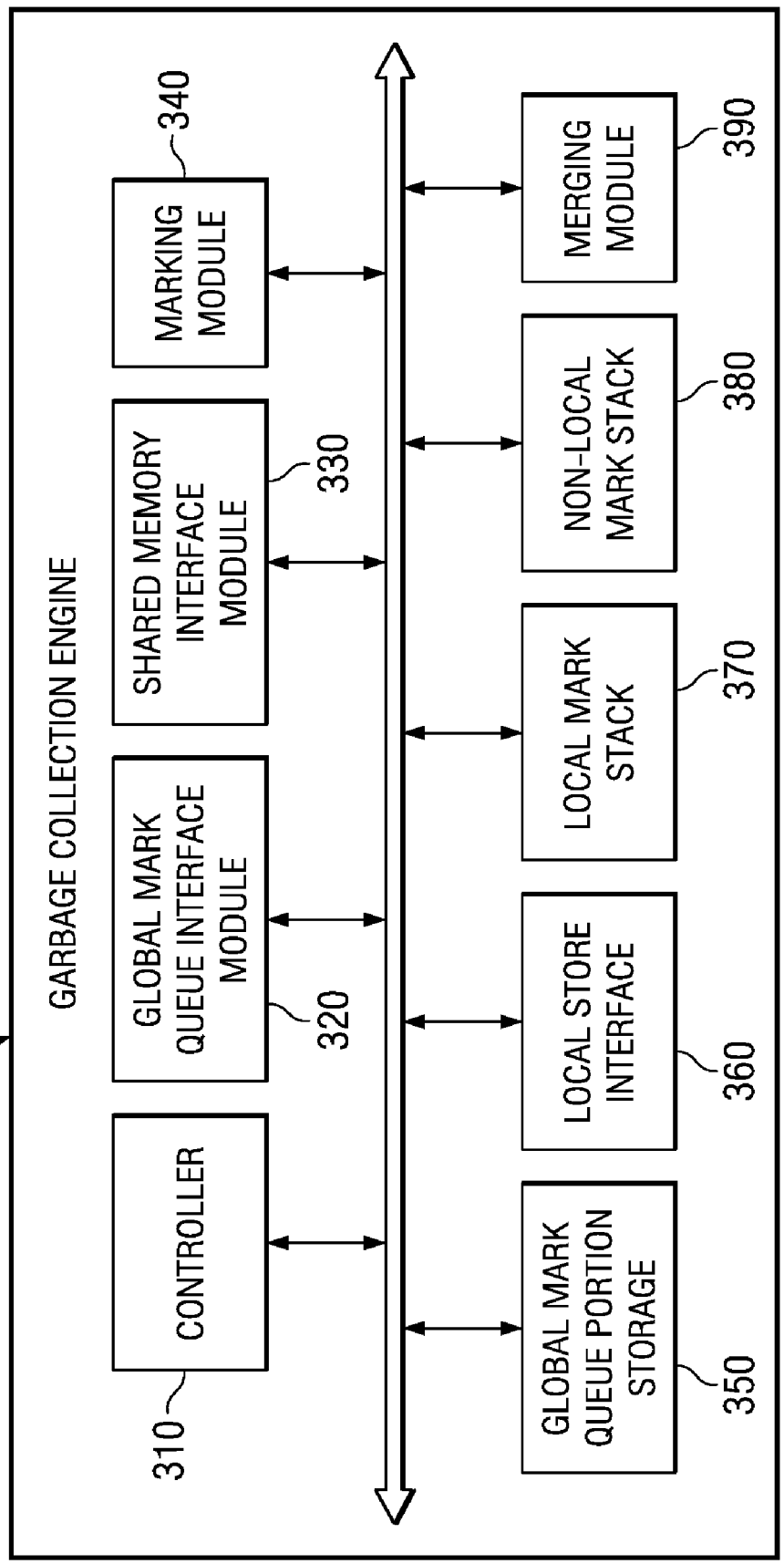
FIG. 3 is an exemplary diagram of a garbage collection mechanism that may be used to perform garbage collection in accordance with one illustrative embodiment.

FIG. 3 is an exemplary diagram of a garbage collection mechanism that may be used to perform garbage collection in accordance with one illustrative embodiment. The garbage collection mechanism shown in FIG. 3 may be integrated into the memory flow controllers (MFCs), such as MFC 200 in FIG. 2, of the SPEs 120-134 of FIG. 1, for example. As such, the garbage collection mechanism in FIG. 3 may make use of MFC registers 240, MMIO interface 250, MFC command queue 280, and the like, to perform the garbage collection operations of the illustrative embodiments.

In one illustrative embodiment, the garbage collection mechanism makes use of MFC commands to obtain the portion of the global mark queue and corresponding chunk of shared memory, with the portion of the global mark queue being stored in the MFC registers 240 and the chunk of shared memory being stored in the local store associated with the MFC. Moreover, MFC commands may be used to perform the "mark and sweep" operation as well as the merge operation with the various mark stacks being maintained by the MFC in the MFC registers 240, for example.

As shown in FIG. 3, the garbage collection engine 300 includes a controller 310, a global mark queue interface module 320, a shared memory interface module 330, a marking module 340, a mark descriptor storage 345, a global mark queue portion storage 350, local store interface 360, local mark stack storage 370, non-local mark stack storage 380, and merging module 390. The elements 310-390 may be implemented as hardware, software, or any combination of hardware and software. In an illustrative embodiment, the elements 310-340, 360 and 390 are implemented as software functions, such as MFC functions, performed by one or more processing elements while elements 345, 350, 370, and 380 may be implemented as hardware elements, such as memories, registers, or the like. Alternatively, all of the elements shown in FIG. 3 may be implemented as hardware devices that may be integrated into the MFC or other parts of the SPEs or as a dedicated unit in the SPEs.

The controller 310 controls the overall operation of the garbage collection engine 300 and orchestrates the operation of the other elements 320-390. The global mark queue interface module 320 is responsible for providing a mechanism to retrieve portions of the global mark queue for use by the garbage collection engine 300 in performing garbage collection operations in accordance with the illustrative embodiments. The portion of the global mark queue retrieved via the global mark queue interface module 320 is stored in the global mark queue portion storage 350 for use in performing the garbage collection operations on the references in this portion of the global mark queue.

The shared memory interface module 330 is responsible for providing a mechanism to retrieve a portion of the shared memory for storing in the local store via local store interface 360. The portion of the shared memory that is retrieved corresponds to the portion of the global mark queue retrieved via the global mark queue interface module 320. The global mark queue interface module 320 and shared memory interface module 330 communicate with the PPE, under the direction of the controller 310 in accordance with a garbage collection methodology programmed into the controller 310, so as to retrieve an appropriate portion of the global mark queue and corresponding portion of the shared memory.

The marking module 340 is responsible for performing the marking of references in the portion of the global mark queue stored in the global mark queue portion storage 350. As part of the marking operation, references to memory objects in the portion of the global mark queue retrieved by the controller 310 via the global mark queue interface module 320 are added to the local mark stack storage 370. These references are then checked by the marking module 340 using a mark operation of a "mark and sweep" garbage collection operation to thereby identify reachable memory objects in the chunk of shared memory stored in the local store and/or memory objects that are not reachable within the chunk of shared memory retrieved and stored in the local store via the shared memory interface module 330 and local store interface 360. Memory object references, that may be encountered as the iterative tracing of memory objects is performed, that are references to memory objects in other chunks of the shared memory are added to the non-local mark stack storage 380.

Those memory objects that are reachable within the chunk of shared memory loaded into the local store are marked as reachable in mark descriptors corresponding to those memory objects. The mark descriptors for the chunk of shared memory may be stored in the mark descriptor storage 345. These mark descriptors constitute a local mark descriptor that is later merged into a global mark descriptor for the entire heap associated with the software program in question for which garbage collection is being performed.

After the marking module 340 performs the marking of local reachable memory objects and non-local memory objects in accordance with the methodology previously described above, the merging module 390 performs merge operations to merge the local mark descriptor in the mark descriptor storage 345 with other local mark descriptors of stacks of other SPEs to generate a global marked stack. The merging module 390 further merges the non-local mark stack 380 with the "to be traced" portion of the global mark queue so that these references may be traced with appropriate chunks of the shared memory.

Figure 4:
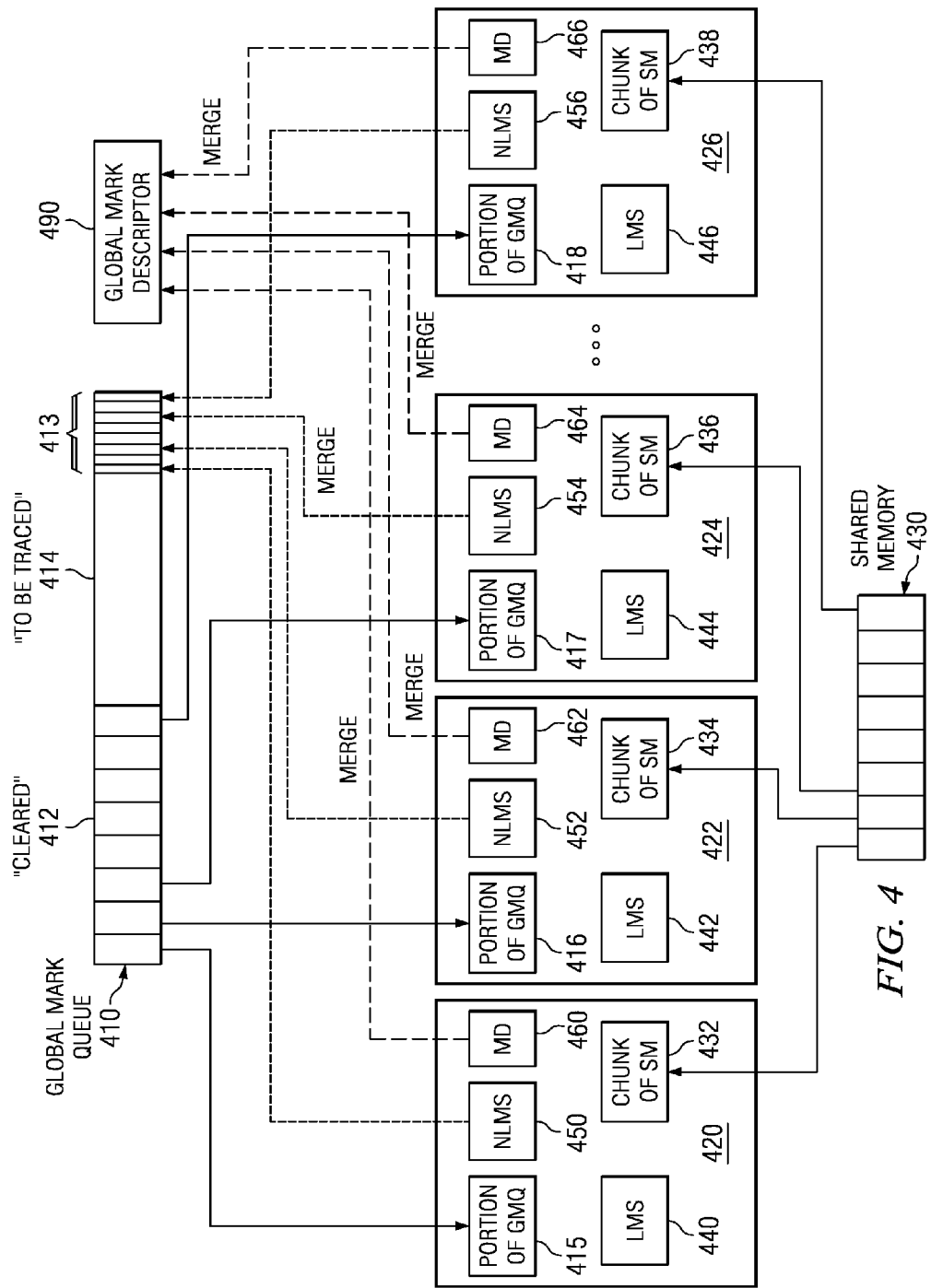
FIG. 4 is an exemplary diagram illustrating a distributed garbage collection operation in accordance with one illustrative embodiment.

FIG. 4 is an exemplary diagram illustrating a distributed garbage collection operation in accordance with one illustrative embodiment. As shown in FIG. 4, a global mark queue 410 has a "cleared" portion 412 and a "to be traced" portion 414. The "cleared" portion 412 is a portion of the global mark queue 410 that contains references to shared memory objects that have been processed by a "mark and sweep" garbage collection operation performed on one or more SPEs 420-426. As portions of the global mark queue are allocated to SPEs 420-426 for local "mark and sweep" garbage collection, these portions of the global mark queue are added to the "cleared" portion 412 of the global mark queue 410.

The "to be traced" portion 414 of the global mark queue 410 is comprised of those references to shared memory objects that have not yet been processed by a "mark and sweep" garbage collection operation or were determined to be references to shared memory objects that were in a non-local portion of the shared memory 430. As portions of the "to be traced" portion 414 of the global mark queue 410 are allocated to SPEs 420-426 for garbage collection, they are added to the "cleared" portion 412 of the global mark queue 410.

As shown in FIG. 4, each SPE 420-426 obtains a portion 415-418 of the global mark queue 410 from the "to be traced" portion 414 of the global mark queue 410 which is then added to the "cleared" portion 412 of the global mark queue 410. Preferably, these portions 415-418 are sequential portions of the global mark queue 410, although this is not required for operation of the illustrative embodiments.

In addition, each SPE 420-426 obtains a corresponding chunk 432-438 of the shared memory 430. The chunk 432-438 that is obtained by each SPE 420-426 corresponds to the portion of the global mark queue 410 that was obtained by that SPE 420-426.

Taking SPE 420 as exemplary of the same operation being performed in each of the other SPEs 422-426 using their own local portions of the global mark queue 416-418 and chunks of shared memory 434-438, based on the portion of the global mark queue 415 and the corresponding chunk of shared memory 432, the SPE 420 performs a marking operation on the chunk of shared memory 432. The portion of the global mark queue 415 that is loaded into the SPE 420 is used to populate the local mark stack (LMS) 440 with references or pointers to memory objects to be checked using the marking operation. This marking operation involves taking the next pointer, or reference, in the local mark stack 440 and determining if the system memory object referenced by that pointer is reachable in the chunk of shared memory 432 stored in the SPE's local store. This may require that the pointer to the system memory object be translated from a shared memory address space to a local store address space, as previously discussed above.

If the system memory object is present in the chunk of shared memory 432, that reference is marked as reachable in the local store in the corresponding mark descriptor 460 and any objects that that memory object references are then traced in an iterative fashion, and marked in a similar manner. This iterative tracing is continued until either a memory object that does not reference any other memory objects is encountered or a memory object that is not present in the chunk of shared memory 432 is encountered. Any references to memory objects that are not in the chunk of shared memory 432 in the local store of the SPE 420 are marked as being non-local memory objects.

After all of the references in the portion of the global mark queue 415 are traced in this manner using the local mark stack 440, the local mark stack 440 is empty and memory object pointers are either marked in the local mark descriptor 460 or are added to the non-local mark stack 450. The local mark descriptor 460 contains all the system memory object references in the portion of the global mark queue 415 that were reachable in the chunk of system memory 432. The non-local mark stack 440 contains references to system memory objects encountered during tracing of references in the portion of the global mark queue 415 that reference system memory objects that were not in the chunk of system memory 432 in the local store.

The local mark descriptors 460-466 of the SPEs 420-426 are merged together to form a global mark descriptor 490. This merging may involve removing redundant entries such that each reference to a system memory object has only one entry in the resulting global mark descriptor 490, for example. In subsequent iterations, the local mark descriptors 460-466, local mark stacks 440-446, and non-local mark stacks 450-456 may be re-initialized and repopulated by subsequent marking operations. The resulting local mark descriptors 460-466 from subsequent iterations may be merged with the existing global mark descriptor 490 so as to continue to update the global mark descriptor 490.

The non-local mark stacks 450-456 of the SPEs 420-426 are merged with the "to be traced" portion 414 of the global mark queue 410 to generate "merged" portion 413 of the global mark queue 410. The "merged" portion 413 may be processed by garbage collection threads of the same or other SPEs 420-426 along with other corresponding chunks of shared memory 430. Again, this merging may involve adding the references back to the "to be traced" portion 414 of the global mark queue 410 in such a manner that each reference has only one entry in the global mark queue 410.

When the portion of the global mark queue 415 is traced and the merging of the local mark descriptor 460 and non-local mark stack 450 are complete, the local mark descriptor 460, local mark stack 440 and non-local mark stack 450 may be re-initialized and a new portion of the global mark queue 410 and corresponding chunk of the shared memory 430 may be retrieved into the SPE 420. Garbage collection may then be performed on this new portion of the global mark queue 410 and corresponding chunk of the shared memory 430. This process may be performed by each of the SPEs 420-426 in an iterative manner until all of the global mark queue 410 is traced and thus, the global mark queue 410 comprises only a "cleared" portion 412 with the "to be traced" portion 414 being empty.

At the time that the entire global mark queue 410 has been traced through the iterative and distributed garbage collection operation described above, the global mark descriptor 490 will contain references to all of the system memory objects in the shared memory 430 that are reachable by the program corresponding to the global mark queue 410. Thus, all other objects in the shared memory 430 that are not referenced by the global mark descriptor 490 may have their memory space reclaimed. A reclamation process may be initialized to perform such reclamation in a manner that is generally known in the art.

Thus, the illustrative embodiments provide mechanisms for performing a garbage collection operation in a distributed manner across a plurality of processors in a heterogeneous multiprocessor system. In such a system, the garbage collection operations may be orchestrated by a control processor, such as the PPE 110 in FIG. 1, while distributed garbage collection on portions of a system memory may be performed by a plurality of co-processors, e.g., SPEs 120-134 in FIG. 1, at the direction of the control processor. Address translation mechanisms are provided for compensating for the different memory views of the control and co-processors.

There are a number of optimizations that may be provided for performing the garbage collection operations described above. For example, after completing tracing of a portion of the global mark queue in the SPE, the SPE may look at the non-local mark stacks of other SPEs to determine if there are references to memory objects in the chunk of system memory currently loaded in the local store of the SPE. In this way, such references in the non-local mark stack of other SPEs may be added to the local mark stack of the current SPE without having to merge the reference back into the global mark queue and then copying it back out to another SPE.

Furthermore, the global mark queue may be pre-sorted such that separate global mark queue regions are generated that correspond to separate system or shared memory regions. When the non-local mark stacks are merged back into the "to be traced" portion of the global mark queue, the references to the memory objects in the non-local mark stacks are merged into the corresponding regions of the global mark queue.

Thus, if a reference in a first non-local mark stack refers to a memory object that is in a first region of the shared memory, then the entry will be merged into a "to be traced" portion of the first region of the global mark queue. Similarly, if an entry in a second non-local mark stack refers to a memory object that is in a second region of the shared memory, then the entry will be merged into a "to be traced" portion of the second region of the global mark queue. This will speed up garbage collection operations since it will be less likely in subsequent iterations of the garbage collection that the same reference will be determine to be in a non-local portion of system memory multiple times.

Figure 5:
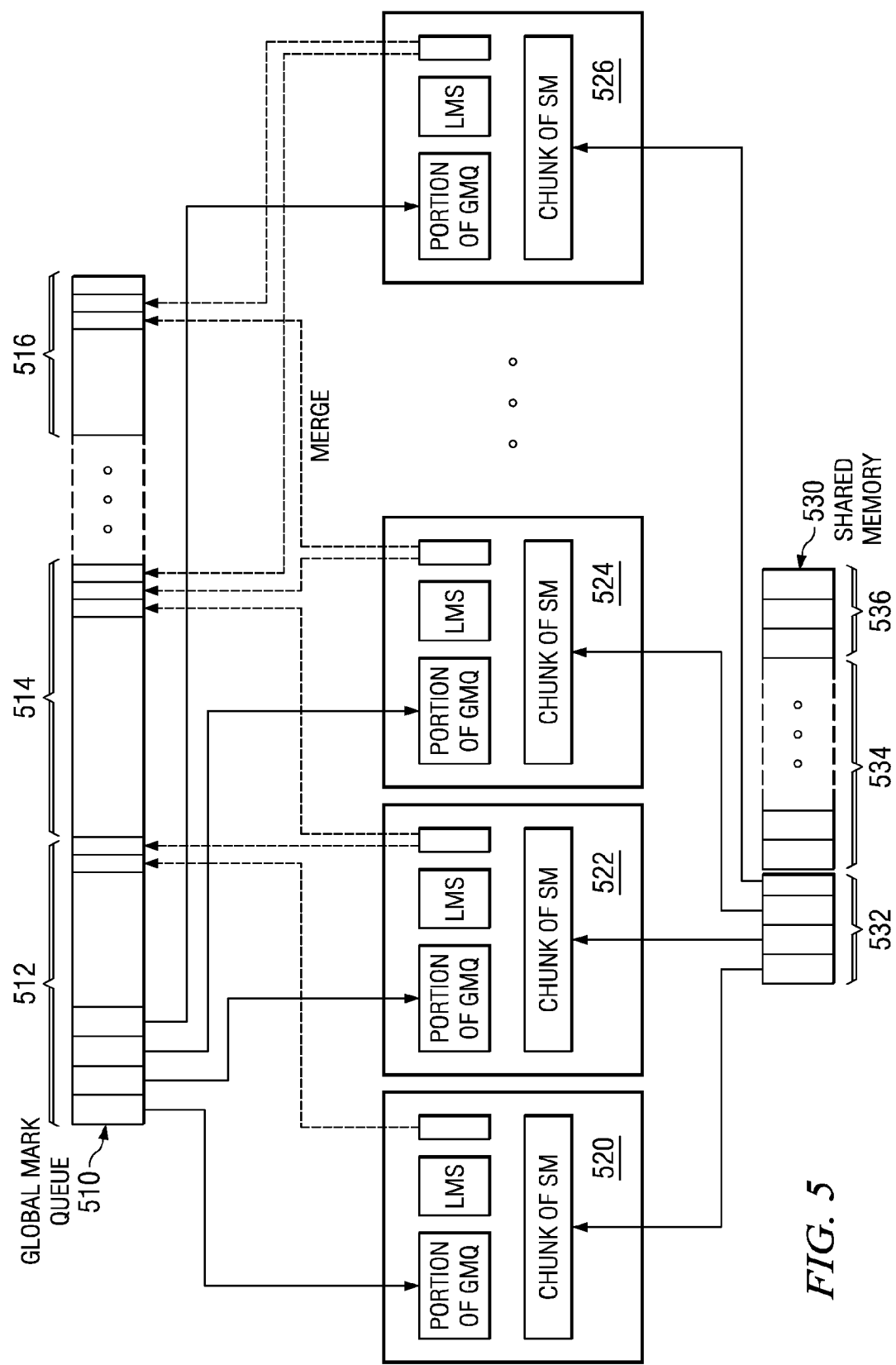
FIG. 5 is an exemplary diagram illustrating a distributed garbage collection operation in accordance with another illustrative embodiment in which a pre-sorted enhanced mark and sweep operation is utilized.

FIG. 5 is an exemplary diagram illustrating a distributed garbage collection operation in accordance with another illustrative embodiment in which a pre-sorted enhanced mark and sweep operation is utilized. FIG. 5 is similar to the illustration provided in FIG. 4 with a few major exceptions. As shown in FIG. 5, the global mark queue 510 is pre-sorted, such as by the PPE 110 of FIG. 1, to have a plurality of regions 512-516 that correspond to regions 532-536 of the shared memory 530. The retrieval of portions of the global mark queue 510 by the individual SPEs 520-526 is performed in much the same manner as described above. However, the merging of the non-local mark stacks 550-556 of the SPEs 520-526 is modified to take into consideration the various regions of the global mark queue 510.

For example, when merging the non-local mark stacks 550-556 of the SPEs 520-526 with the "to be traced" portion of the global mark queue, the merging process determines in which region 512-516 of the global mark queue the references in the non-local mark stacks 550-556 should be placed. This may be done, for example, by using the shared memory address referenced to determine which region 532-536 of the shared memory 530 the reference corresponds to and then identifying a corresponding region 512-516 of the global mark queue 510. These references are then merged with their corresponding "to be traced" portion of that region of the global mark queue.

Since the references are merged into regions of the global mark queue 510 that correspond to the regions of the shared memory 530 that the system memory objects corresponding to the references are present, such pre-sorting and locality-enhanced garbage collection reduces the number of instances that the same reference must be repeatedly merged with the global mark queue. As a result, the number of redundant checks of the same reference is reduced thereby reducing the time to perform the garbage collection operations.

As a further optimization, the chunk size of the system or shared memory that is utilized in each of the SPEs may be modulated based on the current state of the heap. If the heap is relatively empty, i.e. having few memory allocations, then the chunk size may be selected to be relatively large since there will be relatively few pointers or references in the global mark queue upon which to perform garbage collection. In this way, a large block of the system or shared memory may be quickly scanned with a larger chunk size.

Likewise, if the heap is full, there will be a relatively large number of pointers in the global mark queue and thus, the chunk size may be selected to be relatively small. While the smaller chunk size will make the garbage collection operation take a longer amount of time to complete, the smaller chunk size will help ensure that there are no stack overflow exceptions with regard to the local and non-local mark stacks.

In yet a further optimization the local store of each SPE may be bifurcated such that a first portion of the local store is used to store a first chunk of shared memory while another portion of the local store is used to store a portion of a next chunk of shared memory. Marking may be performed on the first chunk of shared memory in the manner generally described above. As the chunk of shared memory is being marked, the next chunk of shared memory may be brought into the local store using DMA operations, for example. In this way, loading of chunks of shared memory and their corresponding portions of the global mark queue may be made more efficient since a somewhat parallel load operation is being performed.

In yet another optimization of the illustrative embodiments, special handling may be provided for overflow of the memory area designated for storing the local mark queue and non-local mark queue. In a first optimization, the non-local mark queue may be merged into the global mark queue maintained in system memory and deleted. In a second optimization, a portion of the local mark queue may be transferred to the global mark queue maintained in system memory and deleted. In a third optimization, the chunk size may be reduced and deferred for future processing, while ensuring that the mark descriptor corresponding to the deferred chunk portion is retained in one of either the local store or global system memory.

Figure 6:
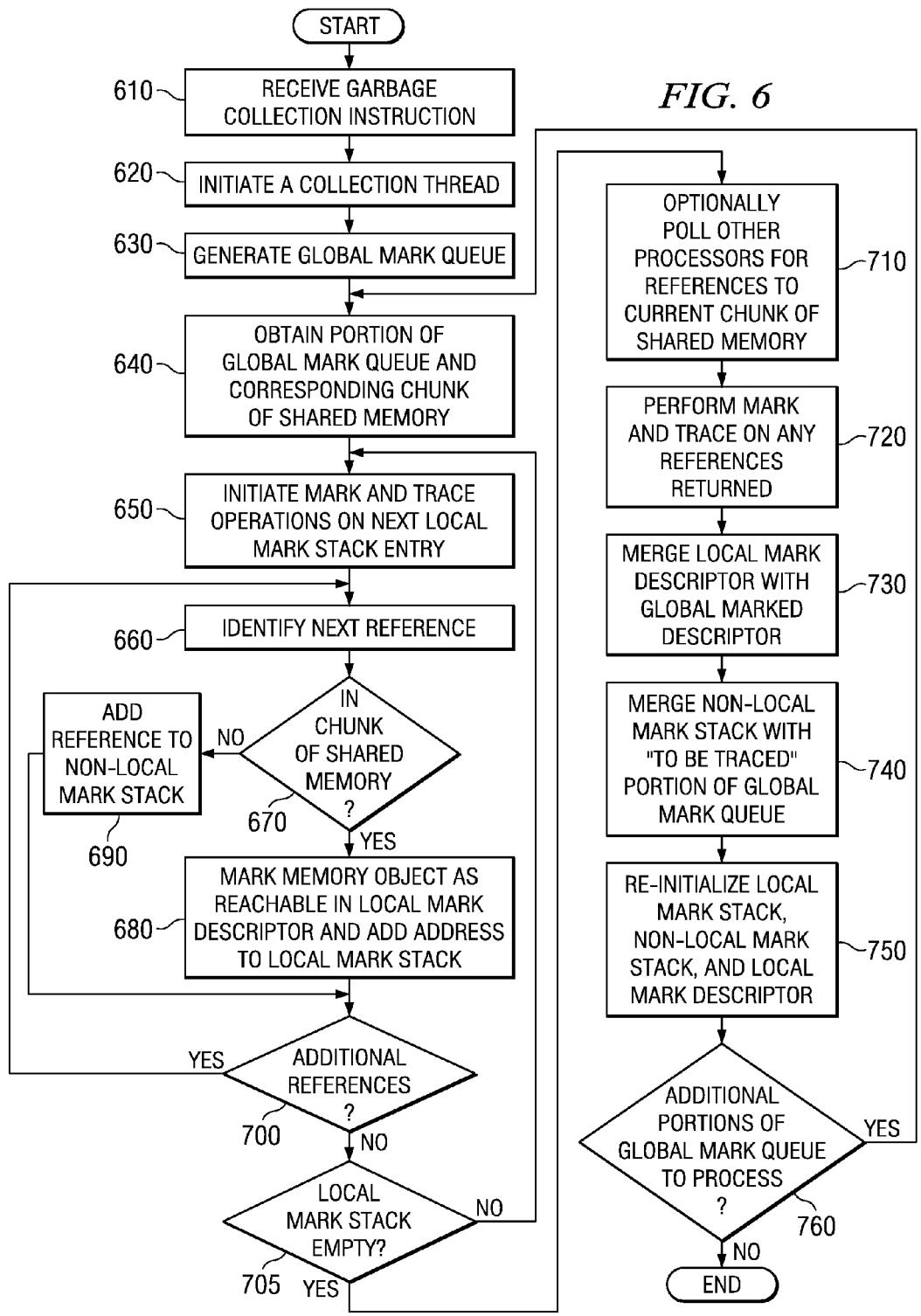
FIG. 6 is a flowchart outlining an exemplary operation for performing garbage collection in accordance with one illustrative embodiment.

FIG. 6 is a flowchart outlining an exemplary operation for performing garbage collection in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts with the SPE receiving an instruction, such as from another SPE or the PPE, to begin garbage collection operations (step 610). The SPE, or optionally, the PPE, initiates a collection thread which utilizes a garbage collection engine to perform garbage collection on a portion of system or shared memory apportioned to a program identified in the received garbage collection instruction (step 620). A global mark queue is generated by the PPE for the portion of system or shared memory allocated to the program, i.e. the heap, and initialized (step 630). The spawned collection thread obtains a portion of the global mark queue and a corresponding chunk of system or shared memory (step 640) to copy to the local mark stack and the local store, respectively.

The collection thread initiates a marking and tracing operation on the references or pointers in the local mark stack, said LMS having been initialized with a portion of the global mark queue. The collection thread selects a next entry from the local mark stack and initiates mark and trace processing of all references contained in the corresponding memory block (step 650). As part of the marking and tracing operation, the collection thread identifies a next reference or pointer in the memory block (step 660) and determines whether the reference points to a memory object in the chunk of system/shared memory or not (step 670). If the reference points to a memory object in the chunk of system/shared memory, the collection thread adds the reference to the local mark stack if the reference corresponds to a previously unreachable reference (i.e., the mark descriptor is set to unreachable), and marks the memory object as reachable in a local mark descriptors data structure, e.g., by adding the reference of the memory object to the local mark descriptor data structure and setting its mark descriptor bits accordingly (step 680). If the reference points to a memory object that is not in the chunk of system or shared memory, the collection thread marks the reference as a non-local marked reference and adds the reference to a non-local mark stack (step 690).

The collection thread then determines whether there are additional references or pointers to memory objects either from the current memory object reference or in the portion of the global mark queue (step 700). If so, the collection thread returns to step 660. If not, the collection thread determines if the local mark stack is empty, i.e. all entries have been processed by a mark and trace operation (step 705). If not, the operation returns to step 650 and selects the next local mark stack entry upon which to perform a mark and trace operation. If the local mark stack is empty, the collection thread optionally polls other processors of the heterogeneous multiprocessor system for references or pointers in non-local work stacks that reference the current chunk of system or shared memory of the present processor (step 710). Any such references or pointers are then traced and marked in a similar manner as in steps 650-690 (step 720).

The collection thread then merges the resulting local mark descriptor with a global mark descriptor (step 730). The collection thread may also merge the resulting non-local mark stack with the "to be traced" portion of the global mark queue (step 740). This may involve determining what regions of the "to be traced" portion of the global mark queue the references in the non-local mark stack correspond to and merging the references with their respective regions of the global mark queue, for example.

The collection thread then re-initializes the local mark descriptor, local mark stack and non-local mark stack (step 750). The collection thread then determines if there are additional portions of the global mark queue to be processed (step 760). If so, the operation returns to step 640 where the next portion of the global mark queue and corresponding chunk of memory are obtained and the process is repeated. If there are no further portions of the global mark queue to be processed, the operation terminates. It should be noted that after termination of the distributed "mark and sweep" operation described above, a memory reclamation process may be performed to reclaim portions of the system or shared memory allocated to memory objects that are not referenced by the global marked stack.

Thus, the illustrative embodiments provide a mechanism for performing garbage collection in a heterogeneous multiprocessor system. The garbage collection may be performed in parallel upon a plurality of processors in the heterogeneous multiprocessor system with results being merged to appropriately identify those system memory objects that are reachable and those that are not. In this way, an efficient garbage collection methodology is provided that utilizes the power of each of the processors in the multiprocessor system.

It should be noted that while the above embodiments are described in terms of a distributed garbage collection operation, the present invention is not limited to such. Rather, a single processor in the heterogeneous multiprocessor system may be allocated to performing garbage collection operations without departing from the spirit and scope of the present invention. Since the local store of such a processor has limited size, it is still necessary to perform the copying in of the portion of the global mark queue and corresponding portion of the shared or system memory on which to perform garbage collection. Thus, the same operations as described above may be performed using a single processor rather than a plurality of processors without departing from the spirit and scope of the present invention.

The illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As described previously above, a data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multiprocessor data processing system, for performing a garbage collection operation on a shared memory, comprising:
   loading, in a processor of the multiprocessor data processing system, a portion of a global mark queue corresponding to a portion of the shared memory, wherein loading the portion of the global mark queue corresponding to the portion of the shared memory comprises:
      initially populating a local mark stack based on references to memory objects in the portion of the global mark queue; and
      loading, in a local store of the processor, the portion of the shared memory corresponding to the portion of the global mark queue, wherein each processor in the plurality of processors of the multi-processor data processing system loads different portions of the global mark queue and corresponding different portions of the shared memory and performs a marking operation on the different portions of the shared memory based on memory object references in the different portions of the global mark queue;
   performing a marking operation on the portion of the shared memory based on references to memory objects in the portion of the global mark queue assigned to the processor, to thereby identify reachable memory objects whose associated memory cannot be reclaimed as part of the garbage collection operation; and
   identifying, during the marking operation, references to memory objects that are not in the portion of the shared memory assigned to the processor, for further processing as part of the garbage collection operation, wherein performing the marking operation on the portion of the shared memory based on references to memory objects comprises:
      tracing memory object references in the portion of the global mark queue and references to dependent memory objects until a reference to a memory object that is not within the portion of the shared memory is identified;
      storing references to memory objects that are within the portion of the shared memory in the local mark stack;
      storing references to memory objects that are not within the portion of the shared memory in a non-local mark stack;
      merging a local mark descriptor data structure associated with the local mark stack with a global mark descriptor data structure; and
      merging the non-local mark stack with a "to be traced" portion of the global mark queue, wherein the "to be traced" portion of the global mark queue contains memory object references that are to be processed by performing the marking operation, and wherein the local mark descriptor data structure contains reachability information for memory objects whose references are in the local mark stack, wherein the global mark descriptor data structure comprises all references to memory objects that were identified as being within the portion of the shared memory, in local mark stacks of processors of the multiprocessor data processing system.

2. The method of claim 1, wherein the portion of the global mark queue is less than an entire portion of the global mark queue, and wherein the portion of the shared memory corresponding to the portion of the global mark queue is less than an entire portion of the shared memory.

3. The method of claim 1, wherein the multiprocessor data processing system is a heterogeneous multiprocessor data processing system comprising a control processor and at least one co-processor, and wherein the control processor and at least one co-processor operate using different instruction sets.

4. The method of claim 3, wherein the loading of a portion of the global mark queue, performing a marking operation, and identifying references to memory objects that are not within the portion of shared memory are performed by one or more of the at least one co-processor.

5. The method of claim 4, wherein the loading, performing and identifying operations are performed by a memory flow controller of the one or more of the at least one co-processor.

* * * * *